(12) United States Patent
Jennes et al.

(10) Patent No.: US 10,633,999 B2
(45) Date of Patent: Apr. 28, 2020

(54) ADJUSTMENT RING OF A VARIABLE TURBINE GEOMETRY

(71) Applicant: Bosch Mahle Turbo Systems GmbH & Co. KG, Stuttgart (DE)

(72) Inventors: Joerg Jennes, Bockenheim (DE); Robert Jost, Stuttgart (DE); Dirk Lummer, Ludwigsburg (DE); Jochen Mueller, Ludwigsburg (DE)

(73) Assignee: BMTS TECHNOLOGY GMBH & CO. KG (DE)

( * ) Notice: Subject to any disclaimer, the term of this patent is extended or adjusted under 35 U.S.C. 154(b) by 274 days.

(21) Appl. No.: 15/648,436

(22) Filed: Jul. 12, 2017

(65) Prior Publication Data
US 2018/0016930 A1 Jan. 18, 2018

(30) Foreign Application Priority Data
Jul. 13, 2016 (DE) .................... 20 2016 103 778 U

(51) Int. Cl.
*F01D 17/12* (2006.01)
*F02B 37/24* (2006.01)
*F01D 17/16* (2006.01)
*F02C 6/12* (2006.01)
(Continued)

(52) U.S. Cl.
CPC ............... *F01D 17/12* (2013.01); *F01D 9/04* (2013.01); *F01D 17/165* (2013.01); *F02B 37/24* (2013.01); *F02C 6/12* (2013.01); *F02C 9/22* (2013.01); *F05D 2220/40* (2013.01); *F05D 2230/23* (2013.01); *F05D 2230/232* (2013.01); *F05D 2230/237* (2013.01); *F05D 2230/51* (2013.01); *F05D 2230/54* (2013.01); *F05D 2240/40* (2013.01); *F05D 2260/50* (2013.01);
(Continued)

(58) Field of Classification Search
CPC .. F01D 9/04; F01D 17/165; F02C 6/12; F02C 9/22; F02B 37/24; F05D 2300/10; F05D 2300/2282; F05D 2230/237; F05D 2220/40; F05D 2230/51; F05D 2230/232; F05D 2260/50; F05D 2230/23; F05D 2240/40; F05D 2230/54; Y02T 10/144
See application file for complete search history.

(56) References Cited

U.S. PATENT DOCUMENTS

2006/0134455 A1* 6/2006 Belhadjhamida ....... C22C 19/07
428/668
2007/0172348 A1* 7/2007 Battig ................... F01D 17/165
415/160
(Continued)

FOREIGN PATENT DOCUMENTS

DE 102009010997 A1 * 9/2009 .......... F01D 17/165
DE 10 2012 210 435 A1 1/2013
(Continued)

OTHER PUBLICATIONS

English abstract for DE-10 2012 210 435.
(Continued)

*Primary Examiner* — Hung Q Nguyen
(74) *Attorney, Agent, or Firm* — Fishman Stewart PLLC

(57) ABSTRACT

An adjustment ring of a variable turbine geometry of an exhaust gas turbocharger is disclosed. The adjustment ring may include at least a first ring segment and a second ring segment.

20 Claims, 2 Drawing Sheets

(51) Int. Cl.
*F02C 9/22* (2006.01)
*F01D 9/04* (2006.01)

(52) U.S. Cl.
CPC .. *F05D 2300/10* (2013.01); *F05D 2300/2282* (2013.01); *Y02T 10/144* (2013.01)

(56) References Cited

U.S. PATENT DOCUMENTS

| | | | |
|---|---|---|---|
| 2007/0214788 A1* | 9/2007 | Sausse | F01D 9/045 60/602 |
| 2010/0209232 A1* | 8/2010 | Stein | F01D 17/165 415/148 |
| 2011/0171008 A1* | 7/2011 | Schall | C22C 38/44 415/159 |
| 2011/0268559 A1 | 11/2011 | Lombard et al. | |
| 2012/0315164 A1* | 12/2012 | Mayernick | F01D 17/165 417/406 |
| 2012/0319020 A1* | 12/2012 | Doehler | F02B 37/183 251/214 |
| 2015/0071762 A1* | 3/2015 | Rentz | F02B 37/22 415/111 |
| 2017/0159555 A1* | 6/2017 | Reyes | F01D 17/165 |

FOREIGN PATENT DOCUMENTS

| | | |
|---|---|---|
| DE | 102011085703 | 5/2013 |
| DE | 102012218138 | 4/2014 |
| EP | 1688602 | 8/2006 |
| GB | 2462115 A | 1/2010 |
| WO | WO-2006/122596 | 11/2006 |
| WO | WO-2009/115437 | 9/2009 |

OTHER PUBLICATIONS

English abstract for DE-102011085703.
English abstract for DE-102012218138.
European Search Report dated Dec. 8, 2017 related to corresponding European Application No. 17173745.5.

* cited by examiner

ADJUSTMENT RING OF A VARIABLE TURBINE GEOMETRY

CROSS-REFERENCE TO RELATED APPLICATION

This application claims priority to a German Patent Application No. 20 2016 103 778.6 filed on Jul. 13, 2016, the contents of which are hereby incorporated by reference in its entirety.

TECHNICAL FIELD

The present invention relates to an adjustment ring of a variable turbine geometry of an exhaust gas turbocharger. The invention relates furthermore to a variable turbine geometry with such an adjustment ring and to an exhaust gas turbocharger with such a variable turbine geometry.

BACKGROUND

From EP 1 688 602 A1 a generic adjustment ring of a variable turbine geometry of an exhaust gas turbocharger is known, which in the contact region to a guide vane lever has an insert bush, in order to enlarge a contact surface to the link lever and thereby to increase the wear resistance.

From DE 10 2012 218 138 A1 an exhaust gas turbocharger with a variable turbine geometry is known, wherein the variable turbine geometry has guide vanes mounted rotatably in a vane bearing ring, which guide vanes are adjustable by means of an adjustment element. The adjustment element itself is configured here as a thin sheet component and has a smaller diameter than the vane bearing ring.

From WO 2009/115437 A1 a vane grille arrangement is known of an exhaust gas turbocharger with variable turbine geometry and with at least one carrier ring, formed from at least one sheet metal part, for the bearing of guide vanes.

Generally, in an exhaust gas turbocharger with variable turbine geometry, an adjustment ring is used for adjusting the guide vanes, which adjustment ring is connected on the one hand to a guide vane lever and on the other hand to the adjustment levers of the individual guide vanes. At the contact points to the guide vane lever and to the individual adjustment levers of the guide vanes, however, an increased wear can occur owing to relative movements and great contact forces. In order to be able to keep this wear within limits at the engagement points of the adjustment ring, often both the guide vane lever and also the individual adjustment levers and/or the adjustment ring are provided with a wear-resistant coating, for example with a nitriding layer. In order, furthermore, to be able to reduce the surface pressure, often also the thickness of the adjustment ring is increased as a whole or only locally in the region of the recesses which are in contact with the adjustment levers or respectively with the guide vane lever.

A disadvantage in the stamped adjustment rings with comparatively great thickness, known from the prior art, however, is that these require a high pressing force for production, particularly in the case of components greater than 6 mm, and have a potentially higher risk with regard to dimensional accuracy. Furthermore, in the case of stamped parts with a component thickness increase in the millimetre range, only a proportionately higher smooth cut proportion and therefore only a somewhat greater contact height occurs compared to the overall thickness of the adjustment ring. Alternatively here of course the production of such an adjustment ring as a cast part is also conceivable, wherein here, however, a complex and also cost-intensive post-processing is necessary, in order to be able to achieve the necessary tolerances for fulfilling the function over the lifespan.

SUMMARY

The present invention is therefore concerned with the problem of indicating for an adjustment ring of the generic type an improved or at least an alternative embodiment, which in particular overcomes the disadvantages known from the prior art.

This problem is solved according to the invention by the subject of the independent claim(s). Advantageous embodiments are the subject of the dependent claims.

The present invention is based on the general idea of configuring an adjustment ring for a variable turbine geometry of an exhaust gas turbocharger for the first time not as a monolithic solid component, but rather to assemble it from at least two individual ring segments or respectively ring parts, which offers the great advantage that the individual ring segments, owing to their distinctly reduced thickness, can be produced at higher quality and, in addition, at a more favourable cost. The adjustment ring, according to the invention, of a variable turbine geometry of an exhaust gas turbocharger therefore has at least a first ring segment and at least a second ring segment, which together form the adjustment ring. With the adjustment ring according to the invention, composed from a plurality of individual ring segments, it is therefore also possible to create an enlarged contact region in the engagement point of a guide vane lever into the adjustment ring and the individual adjustment levers of the guide vanes to the adjustment ring, and at the same time to reduce the surface pressure occurring there, whereby a lesser wear can be achieved with, in particular, great actuating forces and long run times. Through the small thickness of the individual ring segments compared to the overall thickness of the adjustment ring set, the adjustment ring or respectively its individual ring segments can be produced furthermore as a stamped or fine-blanked part with a small rollover, which signifies considerable advantages in production compared to a solid thick adjustment ring, namely in particular a higher dimensional accuracy, a higher smooth cut proportion and a smaller necessary press force. Furthermore, cost advantages can also be achieved compared to a cast part with milling, which are necessary in this, in order to be able to achieve the necessary tolerances for fulfilling the function over the lifespan.

In an advantageous further development of the solution according to the invention, the first and/or the second ring segment is/are configured as a sheet metal component. Such a sheet metal component can be stamped or respectively cut out comparatively simply, at a favourable cost and at a high quality with regard to manufacturing, whereby also the ring segment set necessary for the production of the adjustment ring is able to be produced at a favourable cost and in a dimensionally accurate manner.

In an advantageous further development of the solution according to the invention, the first and the second ring segment are connected securely to one another. Such a connection can take place for example by means of a bonding, riveting, punch riveting, joining by deforming, soldering or welding. Purely theoretically, of course also alternatively a loose arrangement of the at least two individual ring segments is conceivable, in particular a loose laying on one another of the individual ring segments, which then align themselves to one another at the contact surfaces accordingly on transmission of forces. Irrespective of the connection of the individual ring segments to one another, the adjustment ring can therefore be produced at a favourable cost and, moreover, in an extremely flexible manner, i.e. with almost freely selectable thickness, by individual ring segments with corresponding thickness being assembled to form an adjustment ring set.

Expediently, the first and the second ring segment are constructed as identical parts. This offers the great advantage that only one stamping tool is necessary for the production both of the first and also of the second ring segment, whereby the production of the individual ring segments and therefore also of the adjustment ring is possible at a favourable cost.

In a further advantageous embodiment of the solution according to the invention, the first and/or the second ring segment have a wear-resistant coating, in particular a nitriding layer. By means of such a wear-resistant coating, the wear resistance can be distinctly increased, wherein by a nitriding, i.e. a nitrogen content increase of the surface of the individual ring segments, a surface blooming or respectively a surface hardening occurs, which considerably increases the wear resistance and, at the same time, is able to be realized at a favourable cost.

The present invention is based furthermore on the general idea of indicating a variable turbine geometry with a previously described adjustment ring, and an exhaust gas turbocharger with such a variable turbine geometry, wherein of course it is clear that not only a variable turbine geometry, but also a variable compressor geometry can be equipped with such an adjustment ring according to the invention. Such an exhaust gas turbocharger can therefore be produced at a favourable cost, at a high-grade quality and, in addition, in a simple manner with regard to manufacturing.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown, respectively diagrammatically

DETAILED DESCRIPTION

Figure 1:
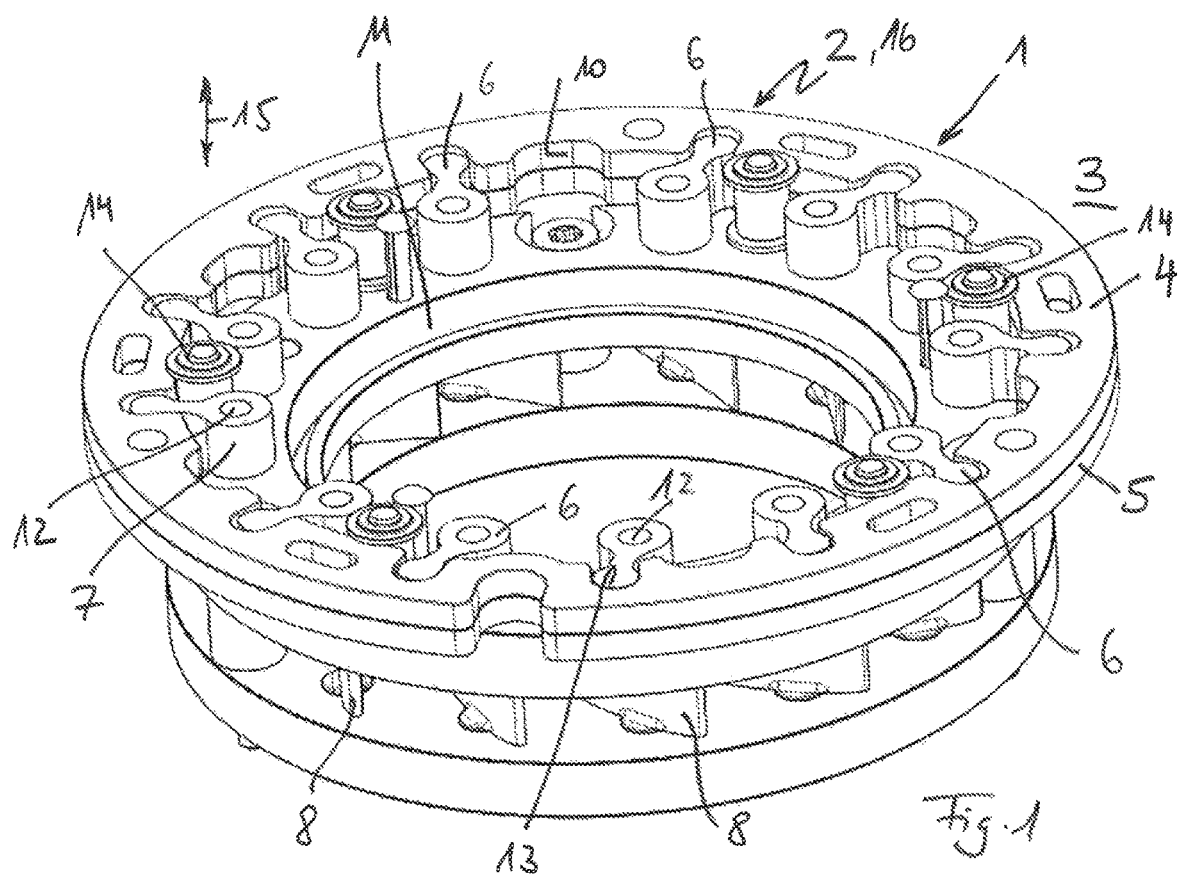
FIG. 1 a variable turbine geometry according to the invention, with an adjustment ring according to the invention with at least two ring segments, FIG. 2 a detail illustration of FIG. 1, FIG. 3 a sectional illustration through the variable turbine geometry according to the invention, FIG. 4 a view onto an adjustment ring according to the invention, FIG. 5 a sectional illustration through an adjustment ring according to the invention, in which the two ring segments are riveted to one another.

According to FIGS. 1 to 5, an adjustment ring 1 according to the invention, of a variable turbine geometry 2 of an exhaust gas turbocharger 3, has at least a first ring segment 4 and at least a second ring segment 5. The actual adjustment ring 1 is therefore assembled from a plurality of individual ring segments 4, 5, here by way of example from two ring segments 4, 5, whereby it is possible to produce the individual ring segments 4, 5 thinner, more simply with regard to manufacturing, and at a more favourable cost. The first and/or second ring segment 4, 5 can be embodied here for example as a simple stamped sheet metal part. Hereby, an extremely flexible build-up of thickness of the adjustment ring 1 is also possible by combination of ring segments 4, 5 of different thickness.

Compared to adjustment rings known hitherto from the prior art, in which the adjustment ring was configured respectively as a monolithic, i.e. solid, component, with the adjustment ring 1 according to the invention, contact surfaces can also be enlarged in the region to adjustment levers 6 or to a guide vane lever 7, and thereby the surface pressure occurring there and the forces to be received can be reduced.

Generally, it is conceivable here that the at least two ring segments 4, 5 are placed loosely on one another and align themselves solely via the contact surfaces to the guide vane lever 7 or respectively to the individual adjustment levers 6 of the guide vanes 8. Alternatively, it is of course also conceivable that the two ring segments 4, 5 are connected securely to one another, for example are bonded, soldered or welded to one another, or are riveted to one another by means of a rivet 9 (cf. FIG. 5), for example by punch riveting, joining by deforming, in particular clinching. Furthermore, it is particularly advantageous, in so far as the at least two ring segments 4, 5 forming the adjustment ring 1 are constructed as identical parts, because in this case only one single stamping tool is necessary.

In order to be able to further increase the wear resistance of the adjustment ring 1, in addition provision can be made that the first and/or second ring segment 4, 5 has a wear-resistant coating 10, in particular is nitrided or boron-treated. By the corresponding method, the ring segments 4, 5 are usually completely nitrided or boron-treated. By such a surface blooming or respectively surface hardening, the high actuating forces occurring in the region of the contact surfaces to the guide vane lever 7 or respectively to the individual adjustment levers 5 of the guide vanes 8 can also be withstood over the entire lifespan.

Figure 2:
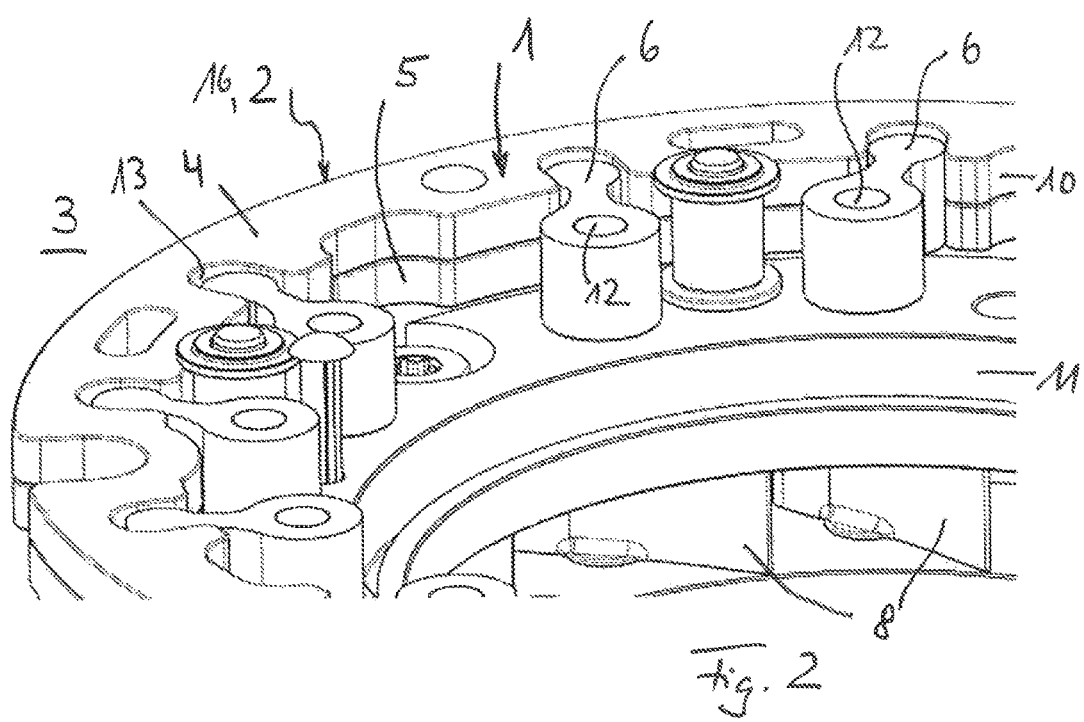
Figure 3:
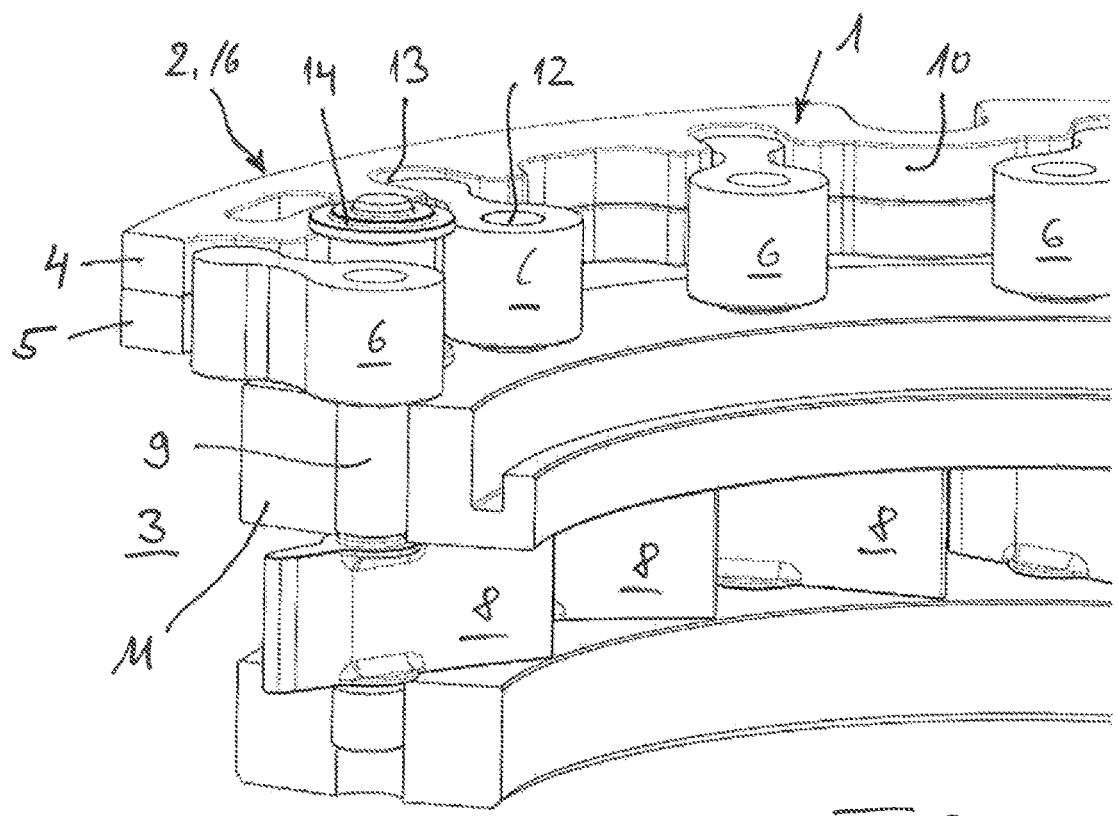
Figure 4:
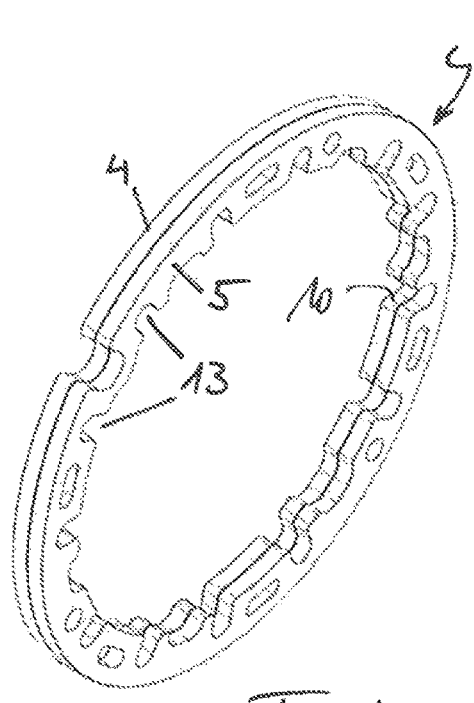
Figure 5:
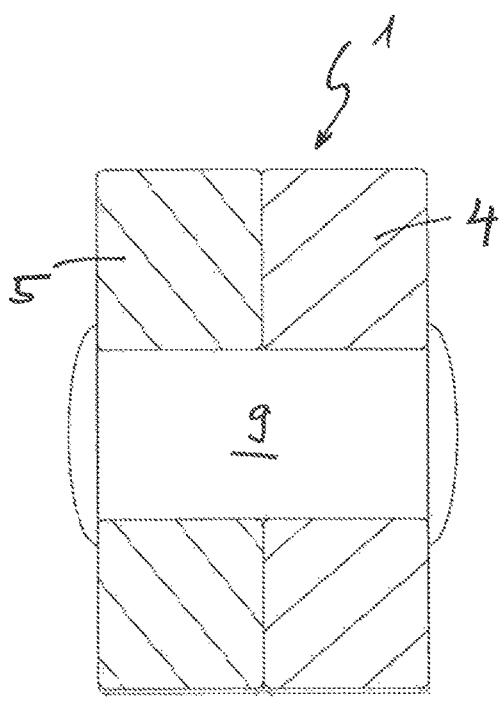

Observing once again the variable turbine geometry 2 of FIGS. 1 to 3, it can be seen that the latter has in a known manner a vane bearing ring 11, in which the individual guide vanes 8 are rotatably mounted via their vane bearing pins 12. This vane bearing ring 11 can of course have two vane bearing rings, as also illustrated. On the side of the vane bearing ring 11 lying opposite the guide vane 8, the vane bearing pin 12 is connected to the adjustment lever 6, which engages into a corresponding recess 13 on the adjustment ring 1, so that the individual guide vanes 8 are adjustable jointly via the adjustment ring 1. The adjustment ring 1 is mounted for example via rollers 14, which permit a smooth-running mounting.

With the adjustment ring 1 according to the invention, it is possible to configure an adjustment ring, which was hitherto configured in a solid manner for obtaining the necessary wear resistance and for obtaining a sufficiently large contact surface, for the first time in a segmented manner, and thereby to produce it at a more favourable cost, and in particular also more flexibly, because for individual adjustment rings 1 for the production of different thicknesses in axial direction 15 a different number of ring segments 4, 5 can be combined with one another. It is also conceivable here that the individual ring segments 4, 5 have respectively different thicknesses. Generally, it is of course also clear that the adjustment ring 1, used according to FIGS. 1 to 3 with a variable turbine geometry 2, can also be used in the same way with a variable compressor geometry 16. The combination of more than two ring segments 4, 5 is of course also conceivable here.

The invention claimed is:

1. An adjustment ring of a variable turbine geometry of an exhaust gas turbocharger, comprising:
   at least a first ring segment and at least a second ring segment, the first ring segment arranged axially adjacent and coaxially to the second ring segment; and
   wherein the first ring segment is coupled to the second ring segment in a rotationally fixed manner.

2. The adjustment ring according to claim 1, wherein at least one of the first ring segment and the second ring segment is a sheet metal component.

3. The adjustment ring according to claim 1, wherein at least one of the first ring segment and the second ring segment is a stamped part.

4. The adjustment ring according to claim 1, wherein one of:
   the first ring segment and the second ring segment are securely connected to one another; and
   the first ring segment and the second ring segment are placed loosely on one another.

5. The adjustment ring according to claim 1, wherein the first ring segment and the second ring segment are secured to one another via at least one of a bonded connection, a riveted connection, a soldered connection, a welded connection, a punch-riveted connection, and a deformed joint.

6. The adjustment ring according to claim 1, wherein the first ring segment and the second ring segment are identical parts.

7. The adjustment ring according to claim 1, further comprising a wear-resistant coating disposed on at least one of the first ring segment and the second ring segment.

8. The adjustment ring according to claim 7, wherein the wear-resistant coating includes at least one of a nitrided layer and a boron-treated layer.

9. The adjustment ring according to claim 1, wherein the first ring segment and the second ring segment each have a respective recess axially aligned with one another to provide a common recess for receiving a lever.

10. The adjustment ring according to claim 1, wherein the first ring segment has a thickness different from that of the second ring segment.

11. A variable turbine geometry, comprising:
    an adjustment ring including at least a first ring segment and a second ring segment, the first ring segment arranged axially adjacent and coaxially to the second ring segment; and
    wherein the first ring segment is coupled to the second ring segment in a rotationally fixed manner.

12. The variable turbine geometry according to claim 11, wherein the first ring segment and the second ring segment are securely connected to one another.

13. The variable turbine geometry according to claim 11, wherein the first ring segment has a first recess that is axially and circumferentially aligned with a second recess of the second ring segment to provide a common recess for receiving a lever.

14. The variable turbine geometry according to claim 11, further comprising a lever engaging into a common recess defined by the first ring segment and the second ring segment.

15. An exhaust gas turbocharger, comprising:
    a variable turbine geometry;
    an adjustment ring for the variable turbine geometry, the adjustment ring including at least a first ring segment and a second ring segment, the first ring segment coupled to the second ring segment in a rotationally fixed manner; and
    a lever engaging into a common recess defined by the first ring segment and the second ring segment.

16. The exhaust gas turbocharger according to claim 15, wherein the first ring segment has a first recess and the second ring segment has a second recess that together define the common recess engaged with the lever, and wherein the first recess and the second recess are axially aligned to one another.

17. The exhaust gas turbocharger according to claim 15, wherein the lever is a guide vane lever or an adjustment lever.

18. The exhaust gas turbocharger according to claim 15, wherein the adjustment ring further includes a wear-resistant coating composed of a nitrided layer disposed on at least one of the first ring segment and the second ring segment.

19. The exhaust gas turbocharger according to claim 15, wherein the first ring segment and the second ring segment rest loosely on one another.

20. The exhaust gas turbocharger according to claim 15, wherein the first ring segment and the second ring segment are secured to one another via a rivet extending axially though the first ring segment and the second ring segment.

* * * * *